US008503338B2

(12) United States Patent
Jöngren et al.

(10) Patent No.: US 8,503,338 B2
(45) Date of Patent: Aug. 6, 2013

(54) OPTIMIZED SIGNALING OF DEMODULATION REFERENCE SIGNAL PATTERNS

(75) Inventors: George Jöngren, Stockholm (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 224 days.

(21) Appl. No.: 13/169,733

(22) Filed: Jun. 27, 2011

(65) Prior Publication Data

US 2011/0317596 A1 Dec. 29, 2011

Related U.S. Application Data

(60) Provisional application No. 61/358,985, filed on Jun. 28, 2010.

(51) Int. Cl.
*H04J 3/00* (2006.01)
*H04J 3/06* (2006.01)
*H04W 4/00* (2009.01)

(52) U.S. Cl.
USPC ............ 370/280; 370/334; 370/337; 370/350

(58) Field of Classification Search
USPC ................. 370/321, 337, 347, 329, 334, 350, 370/503
See application file for complete search history.

(56) References Cited

U.S. PATENT DOCUMENTS

| 8,379,590 | B2 * | 2/2013 | Hooli et al. | 370/330 |
|---|---|---|---|---|
| 2011/0142107 | A1 * | 6/2011 | Pan et al. | 375/219 |
| 2011/0317646 | A1 * | 12/2011 | Luo et al. | 370/329 |
| 2012/0093120 | A1 * | 4/2012 | Ko et al. | 370/329 |
| 2012/0106373 | A1 * | 5/2012 | Gaal et al. | 370/252 |
| 2013/0016604 | A1 * | 1/2013 | Ko et al. | 370/216 |
| 2013/0028221 | A1 * | 1/2013 | Seo et al. | 370/329 |

OTHER PUBLICATIONS

Qualcomm Inc, Conveying OCC for PUSCH Transmissions, 3GPP Draft; R1-102764 OCC for PUSCH TX 3$^{rd}$ Generation Partnership Project; Mobile Competence Centre: Sophia-Antipolis Cedex, France, May 4, 2010.
Nokia Siemens et al. OCC Configuration and Sequence Group Hopping, R1-102964, 3$^{rd}$ Generation Partnership Project; Mobile Competence Centre; Sophia-Antipolis Cedex, France. May 4, 2010.

* cited by examiner

*Primary Examiner* — Warner Wong

(57) ABSTRACT

Orthogonality in cyclic shift (CS) and orthogonal cover code (OCC) selection for DMRS in MIMO is improved by new $n_{DMRS}$ to $n_{DMRS}^{(2)}$ mapping patterns. Values in the mapping tables are arranged in sets, with minimum CS separation between the values in each set. Additionally, the semi-static $n_{DMRS}$ is independently configurable for each UL component carrier (CC) in the case of cross-CC scheduling in carrier aggregation, and the PHICH allocation formula that defines the allocation of the PHICH process relative to the $k^{th}$ codeword (CW) on the $c^{th}$ UL CC is a function of both the CS index $n_{DMRS,k,c}^{(2)}$ that is dynamically assigned to a certain layer of the considered CW and the semi-static CS offset $n_{DMRS,c}^{(1)}$ for the $c^{th}$ CC.

13 Claims, 6 Drawing Sheets

| $n_{DMRS}$ | $n_{DMRS}^{(2)}$ | $n_{DMRS}^{OCC}$ |
|---|---|---|
| 000 | 0 | [+1 +1] |
| 001 | 6 | [+1 +1] |
| 010 | 3 | [+1 -1] |
| 011 | 4 | [+1 +1] |
| 100 | 2 | [+1 +1] |
| 101 | 8 | [+1 -1] |
| 110 | 10 | [+1 -1] |
| 111 | 9 | [+1 -1] |

| $n_{DMRS}$ | $n^{(2)}_{DMRS}$ | $n^{OCC}_{DMRS}$ |
|---|---|---|
| 000 | 0 | [+1 +1] |
| 001 | 6 | [+1 +1] |
| 010 | 3 | [+1 -1] |
| 011 | 4 | [+1 +1] |
| 100 | 1 | [+1 +1] |
| 101 | 7 | [+1 -1] |
| 110 | 10 | [+1 -1] |
| 111 | 9 | [+1 -1] |

*FIG. 4*

| $n_{DMRS}$ | $n^{(2)}_{DMRS}$ | $n^{OCC}_{DMRS}$ |
|---|---|---|
| 000 | 0 | [+1 +1] |
| 001 | 6 | [+1 +1] |
| 010 | 3 | [+1 -1] |
| 011 | 5 | [+1 +1] |
| 100 | 2 | [+1 +1] |
| 101 | 8 | [+1 -1] |
| 110 | 11 | [+1 -1] |
| 111 | 9 | [+1 -1] |

*FIG. 5*

| $n_{DMRS}$ | $n^{(2)}_{DMRS}$ | $n^{OCC}_{DMRS}$ |
|---|---|---|
| 000 | 1 | [+1 +1] |
| 001 | 7 | [+1 +1] |
| 010 | 4 | [+1 -1] |
| 011 | 5 | [+1 +1] |
| 100 | 2 | [+1 +1] |
| 101 | 8 | [+1 -1] |
| 110 | 11 | [+1 -1] |
| 111 | 10 | [+1 -1] |

CARRIER 0
OCC/CS    0   1   2   3   4   5   6   7   8   9   10  11

{+1;+1}  [0]                         [0]

{+1;-1}              [1]                         [1]

CARRIER 1
OCC/CS    0   1   2   3   4   5   6   7   8   9   10  11

OPTIMIZED SIGNALING OF DEMODULATION REFERENCE SIGNAL PATTERNS

RELATED APPLICATIONS

This application claims priority to U.S. Provisional Patent Application Ser. No. 61/358,985, filed Jun. 28, 2010, which is incorporated by reference herein in its entirety.

FIELD OF THE INVENTION

The present invention relates generally to wireless communication networks, and in particular to the selection of orthogonal transmission parameters for reference signals in MIMO and carrier aggregation systems.

BACKGROUND

Wireless communication networks are a ubiquitous part of modern life in many areas. The inexorable trend in wireless communication development is a demand for higher data rates, to deliver a broader array of services and a richer user experience. One recent development with the promise to improve data rates and reliability is the use of multiple antennas in a transmitter and/or receiver. The use of multiple antennas on both the transmitter and receiver results in a multiple-input multiple-output (MIMO) communication channel, having the greatest performance gains over single-antenna or hybrid systems.

Wireless communication networks operate under one or more industry standards, such as WCDMA, WiMax, GMS/EDGE, UTMS/HSPA, and the like. One such standard is the Long Term Evolution (LTE), developed and promulgated by the 3rd Generation Partnership Project (3GPP). Release 10 of the LTE standard, also known as LTE Rel-10, or LTE-Advanced, supports MIMO antenna deployments and MIMO related techniques. A current working assumption in the uplink (UL) of LTE Rel-10 is the support of a spatial multiplexing mode (SU-MIMO) in the communication from a single User Equipment (UE) to the base station, or enhanced Node B (eNodeB or eNB). SU-MIMO targets high data rates in favorable channel conditions. SU-MIMO consists of the simultaneous transmission of multiple data streams on the same bandwidth, where each data stream is referred to as a layer. Multi-antenna techniques such as linear precoding are employed at the transmitter in order to differentiate the layers in the spatial domain and allow the recovery of the transmitted data at a receiver.

Another MIMO technique supported by LTE Rel-10 is MU-MIMO, where multiple UEs belonging to the same cell are completely or partly co-scheduled on the same bandwidth and time slots. Each UE in the MU-MIMO configuration may possibly transmit multiple layers, thus operating in SU-MIMO mode.

It is necessary to allow the receiver to estimate the equivalent channel associated with each transmitted layer in the cell, in order to allow detection of all the data streams. Therefore, each UE must transmit a unique reference signal (RS, or pilot signal) at least for each transmitted layer. Different types of RS are defined—including the DeModulation RS, or DMRS. The receiver is aware of which DMRS is associated with each layer, and performs estimation of the associated channel by executing a channel estimation algorithm, as known in the art. The estimated channel is then employed by the receiver in the detection process to recover the transmitted data from the received data stream.

According to the LTE Rel-10 standard, in its current status, a set of potential RS is defined, where each DMRS is uniquely defined by a cyclic shift (CS) value, with 12 CS values supported, and an orthogonal cover code (OCC), with 2 OCC values defined. In LTE Rel-8, downlink control information (DCI) format 0 for the Physical Uplink Shared Channel (PUSCH) scheduling includes a 3-bit field ($n_{DMRS}$) for signaling of the CS for DMRS. To support SU-MIMO in the uplink of LTE Rel-10, multiple cyclic shifts and/or orthogonal cover codes must be signaled to the UE for DMRS multiplexing. However, it is not practical to signal multiple cyclic shift indices explicitly for all layers due to the large overhead that would be incurred. Accordingly, the working assumption for CS signaling is as follows:

Only one cyclic shift index is signaled in the corresponding DCI as in Rel-8. The mapped cyclic shift value $n_{DMRS}^{(2)}$ from the signaled cyclic shift index $n_{DMRS}$ is used for DMRS of layer-0; the cyclic shift values for other layers are derived from $n_{DMRS}^{(2)}$ according to a pre-defined rule. The table of FIG. 1 provides the working assumption for such pre-defined rule.

There are two possible OCC over the two DMRS symbols within one sub-frame (see FIG. 1). In addition to separating multiple DMRS by different CS, OCC can be signaled to the UE to provide better orthogonality among the multiplexed DMRS from different layers. The working assumption for OCC signaling in RAN1 is implicit signaling of OCC:

The implicitly assigned OCC can be derived from the signaled cyclic shift value: $n_{DMRS}^{(1)} + n_{DMRS}^{(2)}$, where $n_{DMRS}^{(1)}$ is provided by higher layers as a semi-static CS and $n_{DMRS}^{(2)}$ is the signaled (dynamic) CS value in the most recent DCI for the corresponding PUSCH transmission, according to a pre-defined rule. The table of FIG. 1 provides the working assumption for such pre-defined rule. No additional bit is needed in the corresponding DCI for OCC signaling.

The working assumption for mapping from CS value to OCC is illustrated in the table of FIG. 1, where different OCC are mapped to adjacent CS values. Note that $n_{DMRS}^{(2)}$ itself will only be able to signal 8 CS values: 0, 2, 3, 4, 6, 8, 9, and 10. However, $n_{DMRS}^{(1)} + n_{DMRS}^{(2)}$ will be able to address all possible CS values.

The DMRS for each layer (also known as each virtual antenna) is constructed according to the following procedure.

First, after receiving the dynamic CS value $n_{DMRS}^{(2)}$ from the corresponding Physical Downlink Control Channel (PDCCH) and the semi-static CS value $n_{DMRS}^{(1)}$ from higher layers, according to the pre-defined rule depicted in Table 1, the mapped orthogonal cover code index is determined as: $I_{OCC} = f(n_{DMRS}^{(1)} + n_{DMRS}^{(2)})$.

Second, the DMRS for each layer/virtual antenna can be constructed according to the rules depicted in Table 1 for each rank:

TABLE 1

Layer-specific Rules for CS and OCC Calculation

| | Layer (Virtual Antenna) DMRS in Slot 0 & 1 | |
|---|---|---|
| Rank-1 Transmission | 0 | CS: $n_{DMRS}^{(2)}$, OCC Index: $I_{OCC}$ |
| Rank-2 Transmission | 0 | CS: $n_{DMRS}^{(2)}$, OCC Index: $I_{OCC}$ |
| | 1 | CS: $n_{DMRS}^{(2)}+6$, OCC Index: $1-I_{OCC}$ |
| Rank-3 Transmission | 0 | CS: $n_{DMRS}^{(2)}$, OCC Index: $I_{OCC}$ |
| | 1 | CS: $n_{DMRS}^{(2)}+3$, OCC Index: $1-I_{OCC}$ |
| | 2 | CS: $n_{DMRS}^{(2)}+6$, OCC Index: $I_{OCC}$ |

TABLE 1-continued

Layer-specific Rules for CS and OCC Calculation

| | Layer (Virtual Antenna) | DMRS in Slot 0 & 1 |
|---|---|---|
| Rank-4 Transmission | 0 | CS: $n_{DMRS}^{(2)}$, OCC Index: $I_{OCC}$ |
| | 1 | CS: $n_{DMRS}^{(2)}$ +3, OCC Index: 1-$I_{OCC}$ |
| | 2 | CS: $n_{DMRS}^{(2)}$ +6, OCC Index: $I_{OCC}$ |
| | 3 | CS: $n_{DMRS}^{(2)}$ +9, OCC Index: 1-$I_{OCC}$ |

Note that, in Table 1, the CS values for each layer comprise the mapped dynamic CS value for layer 0, $n_{DMRS}^{(2)}$, offset by a predetermined amount for each successive layer. Of these offsets, the minimum value is three (i.e., for rank-3 and rank-4 transmissions). Also, note that the OCC index is the value determined from the table in FIG. 1 and the semi-static CS value $n_{DMRS}^{(1)}$ for layer 0, and then alternating to the other defined OCC value for each successive layer. Ideally, the combination maximally separates DMRS in successive layers, by a CS separation of three, and alternating OCC values.

Schemes for constructing the DMRS for multi-layer transmission, other than those in Table 1 above, are equivalently supported. For example, alternative rules for assigning the CS and OCC values for successive Layers/Virtual Antennas based on $n_{DMRS}^{(2)}$ are possible.

In addition to MIMO support, 3GPP LTE Rel-10 additionally supports multi-carrier operations, also known as carrier aggregation, in order to improve spectrum allocation size and flexibility. In case of multi-carrier operation, independent data channels are modulated onto and transmitted on each of two or more carrier frequencies, known as component carriers (CC), or simply "carriers." The allocation of uplink (UL) and downlink (DL) carriers is flexible, so it is possible to allocate a different set and number of DL and UL carriers for a certain UE.

Cross-CC scheduling is a new Rel-10 resource allocation modality where a single DL CC controls multiple UL CCs. Therefore, control information for all the controlled UL CCs may be conveyed on the same DL CC. For example, the collected ACK/NACK control messages (PHICH) referred to UL transmissions for all the UL CCs may be collected on the same DL CC. In order to allow multiplexing of different PHICH messages on the same CC, each PHICH message is defined by unique $n_{PHICH}^{group}$ and $n_{PHICH}^{seq}$ parameters, which are in turn functions of several allocation parameters including $n_{DMRS}$ for a given CC. Therefore, the working assumption in RAN1 is that cyclic shifts of UL DMRS are available as mechanism to avoid PHICH collisions. In particular, the working assumption on the PHICH formulas is:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH} \quad (1)$$

where the parameters $I_{PRB\_RA}^{lowest\_index}$, $N_{PHICH}^{group}$, $I_{PHICH}$ and $N_{SF}^{PHICH}$ have the meanings defined in 3GPP TS 36.211, 36.212, and 36.213 (e.g., in V.9.0.0 of each the relevant specifications, which are all incorporated herein by reference in their entirety). That is, $N_{SF}^{PHICH}$ is the spreading factor size used for PHICH modulation. $I_{PRB\_RA}^{lowest\_index}$ is the lowest physical resource block (PRB) index in the first slot of the corresponding PUSCH transmission, $N_{PHICH}^{group}$ is the number of PHICH groups configured by higher layers, and $I_{PHICH}$ is a constant whose value depends on the current time-division duplex (TDD)/frequency division duplex (FDD) configuration (for example, the value of $I_{PHICH}$ may depend on whether the UE is currently configured to use a particular subset of the possible TDD UL/DL configurations, such that:

$$I_{PHICH} = \begin{cases} 1 & \text{for } TDD\ UL/DL \text{ configuration 0 with } PUSCH \\ & \text{transmission in subframe } n = 4 \text{ or } 9 \\ 0 & \text{otherwise} \end{cases}$$

Additionally, according to Rel-8 assumptions, $n_{DMRS}$ in equation (1) is given by the latest DCI format 0.

In case of multi-codeword (CW) transmission on the same UL CC (as in the case of multi-layer transmission), an individual PHICH should be generated for each UL CW on each UL CC in the Cross-CC scheduling group.

The proposed working solution has several deficiencies. The scheduling flexibility appears to be limited in some cases of major practical interest, such as Cross-CC scheduling. Collision avoidance in PHICH signaling imposes constraints in the UL-DMRS allocation that reduce scheduling flexibility. Constraints on the allocation of UL-DMRS may lead to unnecessarily suboptimal performance in channel estimation due to poor orthogonality between DMRS of different UEs or layers. Reduced flexibility in the DMRS allocation due to PHICH signaling constraints leads to complex allocation procedures for DMRS. Finally, reduced flexibility in the scheduling due to DMRS constraints leads to complex resource allocation.

SUMMARY

According to certain embodiments described herein, various $n_{DMRS}$ to $n_{DMRS}^{(2)}$ mapping patterns are proposed, which allow CS and OCC selection for DMRS in MIMO operation to observe minimum effective orthogonality. Values in the mapping tables are arranged in sets, with minimum CS separation between the values in each set. Additionally, the semi-static $n_{DMRS}$ is independently configurable for each UL CC in the case of cross-CC scheduling, and the PHICH allocation formula that defines the allocation of the PHICH process relative to the $k^{th}$ CW on the $c^{th}$ UL CC is a function of both the CS index $n_{DMRS,k,c}^{(2)}$ that is dynamically assigned to a certain layer of the considered CW and the semi-static CS offset $n_{DMRS,c}^{(1)}$ for the $c^{th}$ CC.

One embodiment relates to method of determining CS and OCC values associated with DMRS for multiple transmission layers, by a device in a wireless communication system employing MIMO operation. A semi-static CS value $n_{DMRS}^{(1)}$ and a dynamic CS value $n_{DMRS}$ are received. A predetermined table is indexed with $n_{DMRS}$ to obtain a first CS value $n_{DMRS}^{(2)}$ and an OCC value $n_{DMRS}^{OCC}$ associated with DMRS for layer 0. Within the predetermined table, the CS values $n_{DMRS}^{(2)}$ are arranged in two or more sets of CS values $n_{DMRS}^{(2)}$, the CS values $n_{DMRS}^{(2)}$ within each set being separated by a minimum predetermined, layer-specific offset. A first CS value associated with DMRS for other layers is derived by adding a predetermined, layer-specific offset to $n_{DMRS}^{(2)}$. A second CS value for each layer is calculated by adding $n_{DMRS}^{(1)}$ and $n_{DMRS}^{(2)}$.

Another embodiment relates to a method of determining CS and OCC values associated with DMRS for multiple transmission layers and component carriers, and PHICH allocation, by a device in a wireless communication system employing MIMO operation and carrier aggregation. A semi-static CS value $n_{DMRS,c}^{(1)}$ associated with each component carrier (CC) in the case of cross-CC scheduling is received.

The allocation of the PHICH process relative to the $k^{th}$ codeword on the $c^{th}$ CC is a function of both a first CS value $n_{DMRS,k,c}^{(2)}$ associated with DMRS for a certain layer of a codeword and the semi-static CS value $n_{DMRS,c}^{(1)}$ associated with the $c^{th}$ CC.

BRIEF DESCRIPTION OF THE DRAWINGS

FIG. 1 is a mapping table for DMRS cyclic shift values according to the prior art.

FIG. 2 is a diagram of the prior art DMRS cyclic shift mapping for multi-carrier operation according to the table of FIG. 1.

FIG. 4 is a mapping table for DMRS cyclic shift values according to one embodiment of the present invention.

FIG. 5 is a mapping table for DMRS cyclic shift values according to another embodiment of the present invention.

FIG. 6 is a mapping table for DMRS cyclic shift values according to yet another embodiment of the present invention.

FIG. 7 is a diagram of the DMRS cyclic shift mapping for multi-carrier operation according to the table of FIG. 4.

FIG. 9 is a diagram of the DMRS cyclic shift mapping for multi-carrier operation according to the table of FIG. 1 but using semi-static cyclic shift values according to one embodiment of the present invention.

DETAILED DESCRIPTION

Figure 3:
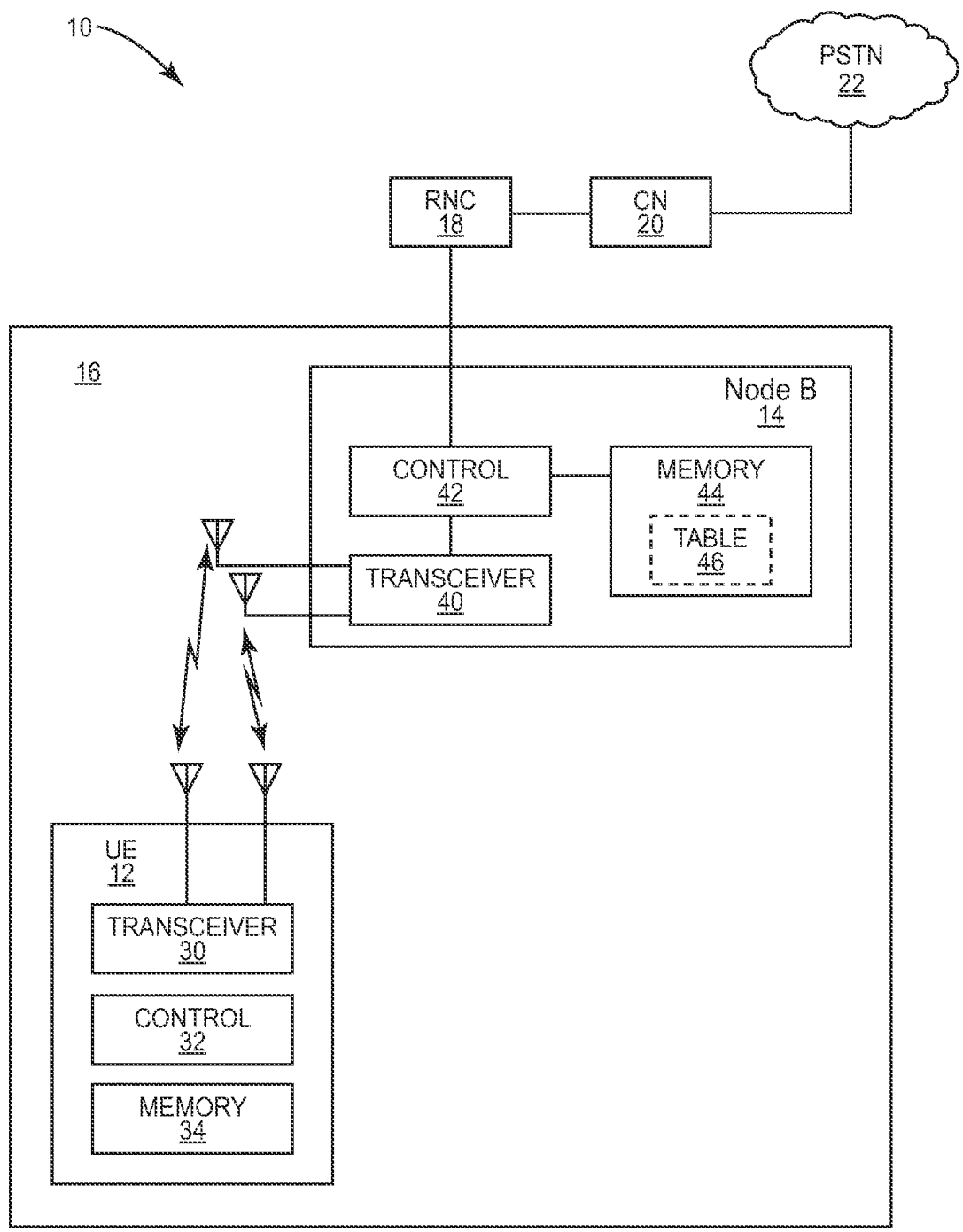
FIG. 3 is a functional block diagram of a wireless communication network.

FIG. 3 depicts a representative wireless communication network 10, such as an LTE-Advanced network 10 (although embodiments of the invention are not limited to this Radio Access Technology). A UE 12 communicates with a NodeB or eNodeB 14, which provides radio communication services to a plurality of UE 12 in a geographic area, or cell 16. The eNodeB 14 is controlled by a Radio Network Controller (RNC) 18, which connects through a Core Network (CN) 20 to one more other packet data or telecommunication networks, such as the Public Switched Telephone Network (PSTN) 22.

The UE 12 includes a Radio Frequency (RF) transceiver 30, which receives and transmits wireless communication (e.g., data and control) signals from and to the eNodeB 14 on one or more antennas 31A, 31B. The transceiver 30 is controlled by a controller 32, which may comprise a general purpose processor, Digital Signal Processor (DSP), or other processing circuit, as known in the art. Functionality comprising embodiments of the present invention may be implemented as software modules stored in memory 34 and executed by the controller 32.

Similarly, the eNodeB 14 includes an RF transceiver 40, which receives and transmits wireless communication signals from and to one or more UE 12 in the cell 16, on one or more antennas 41A, 41B. The transceiver 40 is controlled by a controller 42, which may comprise a general purpose processor, Digital Signal Processor (DSP), or other processing circuit, as known in the art. Functionality comprising embodiments of the present invention may be implemented as software modules stored in memory 44 and executed by the controller 42. Additionally, a table mapping a CS index $n_{DMRS}$ to a dynamic CS value for layer 0 $n_{DMRS}^{(2)}$, as discussed further herein, may reside in memory 44. The dual antennas 31A, 31B and 41a, 41b on the UE 10 and eNodeB 14, respectively, indicate that the network 10 supports SU- and MU-MIMO. Furthermore, the dual wireless communication indicators mean that the network 10 supports carrier aggregation.

When employing multi-layer transmission it is important to achieve maximum orthogonality between the DMRS of the different layers by combining CS and OCC separation and by maximizing the distance between adjacent DMRS. The minimum inter-DMRS distance becomes particularly important when four layers are co-scheduled on the same CC. These layers may all belong to the same UE or to different UEs co-scheduled in MU-MIMO configuration.

In order to maximize the distance between layers, the working assumption in case of four layers per CC is to divide adjacent DMRS with a combination of three CS and possibly OCC. Simulation results show that the performance achieved with smaller inter-DMRS distance is not sufficient to achieve acceptable link performance in case of four-layer transmission.

In case of two layers per UE, the working assumption is to separate the 2 DMRS of the UE by six CS values, while in case of three layers per UE the working assumption is to divide the adjacent DMRS of the UE by three CS values and OCC. Thus, according to the working assumption in Rel-10, DMRS should be allocated to positions that are multiple of three CS positions in order to maximize spacing between DMRS belonging to the same UE or to different UEs in MU-MIMO modality.

As previously observed, the $n_{DMRS}$ field is used in Rel-8 also for PHICH allocation according to equation (1). In case of Cross-CC scheduling and multi-CW transmission, as for Rel-10, the PHICH allocation shall be different for each CW and each CC. A natural extension of equation (1) is to substitute $n_{DMRS}$ with $n_{DMRS,k,c}^{(2)}$, thus obtaining:

$$n_{PHICH,k,c}^{group} = (I_{PRB\_RA}^{lowest\_index} + n_{DMRS,k,c}^{(2)}) \bmod N_{PHICH}^{group} + I_{PHICH} N_{PHICH}^{group}$$

$$n_{PHICH,k,c}^{seq} = (\lfloor I_{PRB\_RA}^{lowest\_index}/N_{PHICH}^{group} \rfloor + n_{DMRS,k,c}^{(2)}) \bmod 2N_{SF}^{PHICH} \quad (2)$$

In equation (2), the field $n_{DMRS,k,c}^{(2)}$ represents the CS index for one of the layers associated to the $k^{th}$ CW on the $c^{th}$ UL CC. In case the considered CW is mapped to multiple layers (and so multiple CS values) $n_{DMRS,k,c}^{(2)}$ is chosen according to a rule. For example, $n_{DMRS,k,c}^{(2)}$ could be the CS associate to the DMRS corresponding to the $1^{st}$ layer of the considered CW.

It is observed that the current mapping of $n_{DMRS}$ to $n_{DMRS,k,c}^{(2)}$ values according, e.g., to the table of FIG. 1, does not respect the desired regularity property, making it inefficient to schedule users, especially in MU-MIMO configuration. An example of this is demonstrated in FIG. 2, which depicts the CS/OCC spacing using the mapping table of FIG. 1. In this example, two UL carriers are controlled by one DL carrier. Two UE 12 are co-scheduled in MU-MIMO modality on each CC and two layers per UE 12 are assumed. According to Rel-10 working assumptions, in case of rank-2 transmission (two layers per UE 12) a different CW is associated with each layer. Therefore, a PHICH instance is generated according to the index $n_{DMRS,k,c}^{(2)}$ for each $k^{th}$ allocated codeword on each $c^{th}$ UL CC.

Note that, according to the working assumption in the prior art (e.g., FIG. 1), the allocation of the CS on the second CC is suboptimal, as the spacing of three CS and OCC between adjacent layers is not respected. Following the mapping in FIG. 1 and the rules listed above in Table 1, the first two DMRS, transmitted on the first carrier, are assigned cyclic shifts of 0, 3, 6, and 9, with alternating OCC. However, this is not possible for the DMRS transmitted on the second carrier. A CS of one is not supported in the table of FIG. 1, so DMRS for layer 2 is mapped to a CS of 2. The rules of Table 1 require a minimum CS spacing of three; however a CS of five is not supported in the table of FIG. 1, so DMRS for layer 2 is mapped to a CS of 4.

According to one embodiment of the present invention, a table mapping $n_{DMRS}$ to $n_{DMRS,k,c}^{(2)}$ values comprises a plurality of sets, wherein the CS values in each set have a minimum CS spacing corresponding to the minimum among the layer-specific offsets specified in the rules of Table 1. In particular, of the twelve potential CS values, the table mapping $n_{DMRS}$ to $n_{DMRS,k,c}^{(2)}$ values comprises two sets, and the minimum CS spacing in each set is three. FIG. 4 depicts one embodiment wherein the table conforms to this restriction. In the table of FIG. 4, the mapping is constructed according to the principle of mapping 8 CS out of the grid of available 12 CS in a regular way, so that it is possible to allocate DMRS that are spaced by three CS values in MU-MIMO settings. FIGS. 5 and 6 depict alternative mappings that conform to the same restriction.

FIG. 7 depicts the allocation of resources in the same example as for FIG. 2, but considering the allocation rule according to the embodiment of the present invention depicted in FIG. 4. It is now possible to achieve optimal inter-DMRS spacing for the considered configuration, thus overcoming the technical deficiency in the prior art mapping (e.g., FIG. 1). In particular, the DMRS on carrier 0 are mapped to CS 0, 3, 6, and 9, with alternating OCC, as in the prior art. However, according to the mapping of the table of FIG. 4, the DMRS on carrier 1 are able to be mapped to CS 1, 4, 7, and 10, also achieving a CS separation of three.

Figure 8:
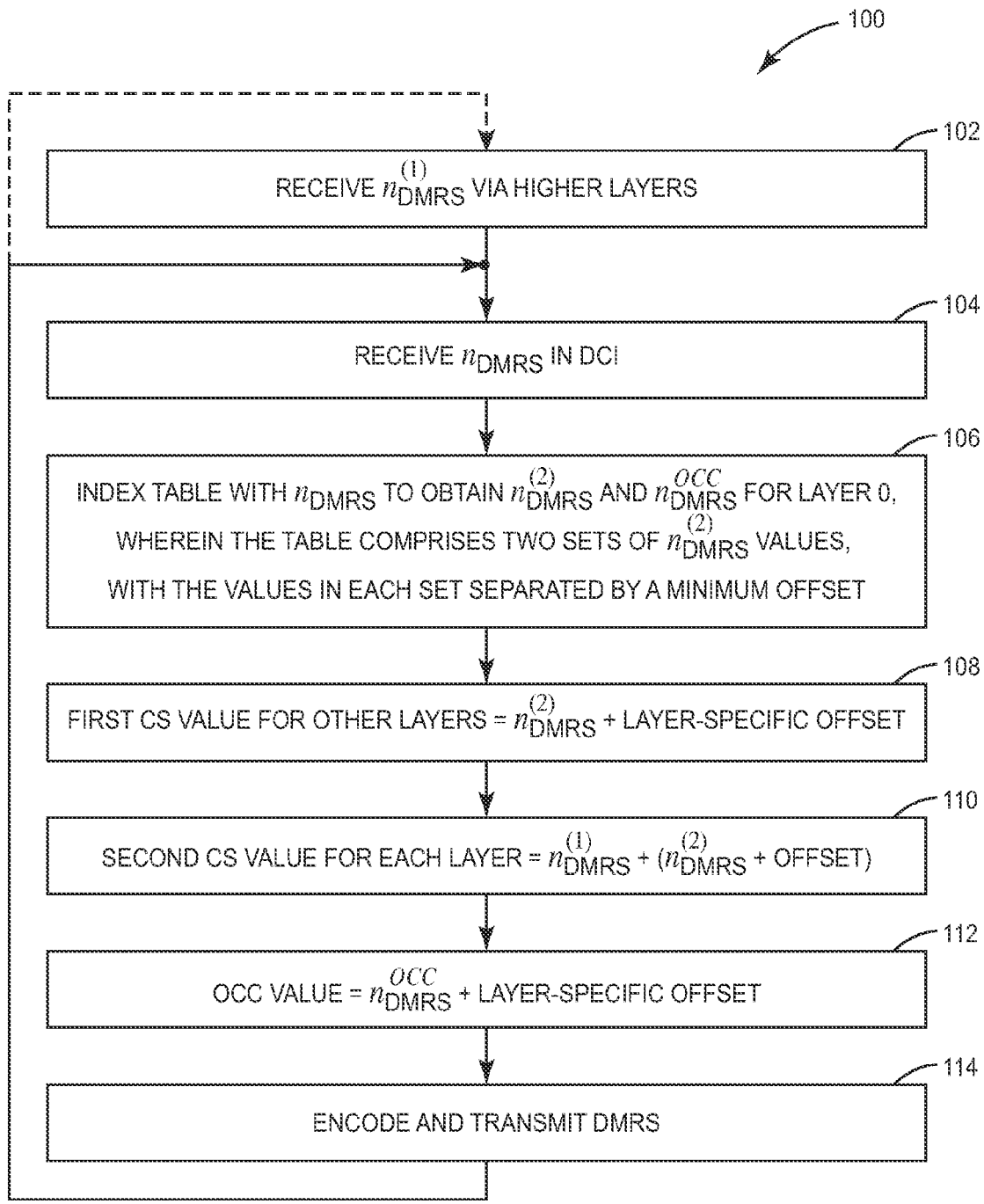
FIG. 8 is a flow diagram of a method of determining cyclic shift values for DMRS.

FIG. 8 depicts a method 100 of determining CS and OCC values associated with DMRS, for each transmission layer, by a transceiver, such as a UE 12, in a wireless communication system 10 employing MIMO operation. A semi-static CS value $n_{DMRS}^{(1)}$ is received (block 102), such as from higher layer signaling via an eNodeB 14. A dynamic CS index value $n_{DMRS}$ is received (block 104), such as in a DCI transmission from the eNodeB 14. A predetermined table is indexed with $n_{DMRS}^{OCC}$ (block 106) to obtain one of, e.g., twelve first CS values $n_{DMRS}^{(2)}$ and an OCC value $n_{DMRS}^{OCC}$ associated with DMRS for layer 0. The CS values $n_{DMRS}^{(2)}$ in the table are arranged into, e.g., two sets of CS values $n_{DMRS}^{(2)}$, the CS values $n_{DMRS}^{(2)}$ within each set being separated by a minimum predetermined offset (e.g., three). For layers other than layer 0, a first CS value associated with DMRS for that layer is derived by adding an integer multiple of the minimum predetermined offset to $n_{DMRS}^{(2)}$ (block 108). A second CS value for each layer (the one used to encode DMRS) is calculated by adding $n_{DMRS}^{(1)}$ and ($n_{DMRS}^{(2)}$+offset) (block 110). An OCC value is calculated by adding $n_{DMRS}^{OCC}$ (the OCC value for layer 0, obtained by indexing the table with $n_{DMRS}$) to a layer-specific offset (block 112). DMRS are then encoded using the final CS and OCC values for each layer, and transmitted (block 114). The DMRS are received and decoded, such as by the eNodeB 14, and are used to characterize the channel, as an aid in interpreting received data streams on each layer. The process then repeats with the reception of a new dynamic CS value $n_{DMRS}$ (block 104). The semi-static CS value $n_{DMRS}^{(1)}$ is updated (block 102) on an infrequent basis by higher level signaling, as indicated by the dashed line in FIG. 8.

One embodiment of the present invention is based on a modification of the PHICH mapping rule. According to the prior art (e.g., Rel-8), the PHICH allocation is a function of the dynamically signalled DMRS allocation index $n_{DMRS}$ on PDCCH.

However, flexibility in CS allocation is enhanced by the combined use of the dynamically signalled index $n_{DMRS}^{(2)}$ and a semi-statically signalled index $n_{DMRS}^{(1)}$. According to one embodiment, $n_{DMRS}^{(1)}$ is employed in order to improve flexibility in PHICH resource allocation in case of cross-CC scheduling. In particular, the $n_{DMRS}^{(1)}$ index is signalled per UL CC in case of cross-CC scheduling, and is re-labelled as $n_{DMRS,c}^{(1)}$ where c denotes the CC index.

Additionally, the PHICH allocation formula of equation (1) is modified. Dependency of the PHICH allocation on the DMRS index $n_{DMRS,k,c}^{(2)}$ for CW k and carrier c is introduced, optionally in conjunction with the semi-static DMRS allocation offset per carrier $n_{DMRS,c}^{(1)}$.

The modified PHICH allocation rule according to one embodiment is:

$$n_{PHICH,k,c}^{group} = (I_{PRB\_RA}^{lowest\_index} + n_{DMRS,k,c}^{(2)} + n_{DMRS,c}^{(1)}) \bmod N_{PHICH}^{group} + I_{PHICH} N_{PHICH}^{group}$$

$$n_{PHICH,k,c}^{seq} = (\lfloor I_{PRB\_RA}^{lowest\_index} / N_{PHICH}^{group} \rfloor + n_{DMRS,k,c}^{(2)} + n_{DMRS,k,c}^{(1)}) \bmod 2N_{SF}^{PHICH} \quad (3)$$

The modified PHICH allocation rule according to another embodiment is:

$$n_{PHICH,k,c}^{group} = (I_{PRB\_RA}^{lowest\_index} + n_{DMRS,k,c}^{(2)} + n_{DMRS,c}^{(1)}) \bmod N_{PHICH}^{group} + I_{PHICH} N_{PHICH}^{group}$$

$$n_{PHICH,k,c}^{seq} = (\lfloor I_{PRB\_RA}^{lowest\_index} / N_{PHICH}^{group} \rfloor + n_{DMRS,k,c}^{(2)}) \bmod 2N_{SF}^{PHICH} \quad (4)$$

The modified PHICH allocation rule according to another embodiment is:

$$n_{PHICH,k,c}^{group} = (I_{PRB\_RA}^{lowest\_index} + n_{DMRS,k,c}^{(2)}) \bmod N_{PHICH}^{group} + I_{PHICH} N_{PHICH}^{group}$$

$$n_{PHICH,k,c}^{seq} = (\lfloor I_{PRB\_RA}^{lowest\_index} / N_{PHICH}^{group} \rfloor + n_{DMRS,k,c}^{(2)} + n_{DMRS,k,c}^{(1)}) \bmod 2N_{SF}^{PHICH} \quad (5)$$

These embodiments achieve two objectives. First, multiplexing of different PHICH messages referring to different CW in cross-CC scheduling modality is enabled. Second, enhancement of DMRS allocation flexibility is achieved by exploiting the different $n_{DMRS,c}^{(1)}$ on different CC.

FIG. 9 depicts an example, considering the same settings as those described with respect to the example of FIG. 2, and $n_{DMRS,0}^{(1)}=0$ and $n_{DMRS,1}^{(1)}=1$ is considered. The $n_{DMRS}$ to $n_{DMRS}^{(2)}$ mapping rule according to the prior art (i.e., the table of FIG. 1) is considered. The modified PHICH allocation rules according to any of equations (3), (4) or (5) are considered. It is now possible to preserve optimal DMRS allocation even in this setting, because none of the allocated DMRS are associated with identical ($n_{PHICH,k,c}^{group}$, $n_{PHICH,k,c}^{seq}$) parameters.

Embodiments of the present invention present numerous advantages over the prior art. Embodiments enable greater orthogonally of DMRS by allowing for the minimum recommended DMRS separation in CS and OCC for each transmission layer. Embodiments also allow for additional efficiency in DMRS assignment compared to the prior art. Improved scheduling flexibility is enabled for multi-carrier operation, and PHICH constraints are reduced for practical scheduling configurations.

Although embodiments of the present invention have been described herein as being performed in a UE 12, based on CS parameters received from an eNodeB 14, the invention is not limited to this configuration. Rather, embodiments may be advantageously performed in any transceiver node of a wireless communication network 10 that transmits reference signals to assist a receiver in channel characterization. Furthermore, although embodiments have been described herein with respect to an LTE-Advanced network 10, the present invention is not limited to this protocol or Radio Access Technology, and may be advantageously applied in a wide variety of wireless communication systems.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining cyclic shift (CS) and orthogonal cover code (OCC) values associated with DeModulation Reference Signals (DMRS), for a plurality of transmission layers, by a device in a wireless communication system employing Multiple Input Multiple Output (MIMO) operation, comprising:
receiving a semi-static cyclic shift (CS) value $n_{DMRS}^{(1)}$;
receiving a dynamic CS index value $n_{DMRS}$;
indexing a predetermined table with $n_{DMRS}$ to obtain a first CS value $n_{DMRS}^{(2)}$ and an orthogonal cover code (OCC) value $n_{DMRS}^{OCC}$ associated with DMRS for layer 0;
deriving a first CS value associated with DeModulation Reference Signals (DMRS) for each other layer by adding a different integer multiple of a predetermined minimum offset to $n_{DMRS}^{(2)}$; and
calculating a second CS value for each layer by adding $n_{DMRS}^{(1)}$ to the first CS value;
wherein within the predetermined table, the CS values $n_{DMRS}^{(2)}$ are arranged in two or more sets of CS values $n_{DMRS}^{(2)}$, the CS values $n_{DMRS}^{(2)}$ within each set being separated by the predetermined minimum offset.

2. The method of claim 1 wherein the dynamic CS value $n_{DMRS}$ comprises three bits.

3. The method of claim 1 further comprising deriving an OCC value associated with DMRS for other layers by adding a predetermined OCC offset to the OCC value $n_{DMRS}^{OCC}$ associated with DMRS for layer 0.

4. The method of claim 3 further comprising encoding DMRS for all layers using the second CS value for each layer and the final OCC value for each layer.

5. The method of claim 1 wherein the predetermined minimum offset is three.

6. The method of claim 1 wherein receiving a dynamic CS value $n_{DMRS}$ comprises receiving $n_{DMRS}$ in a Downlink Control Information (DCI) format.

7. The method of claim 1 wherein receiving from a transmitter a semi-static CS value $n_{DMRS}^{(1)}$ comprises receiving $n_{DMRS}^{(1)}$ via higher layer signaling.

8. The method of claim 1 wherein the predetermined table comprises:

| $n_{DMRS}$ | $n_{DMRS}^{(2)}$ | $n_{DMRS}^{OCC}$ |
|---|---|---|
| 000 | 0 | [+1 +1] |
| 001 | 6 | [+1 +1] |
| 010 | 3 | [+1 −1] |
| 011 | 4 | [+1 +1] |
| 100 | 1 | [+1 +1] |
| 101 | 7 | [+1 −1] |
| 110 | 10 | [+1 −1] |
| 111 | 9 | [+1 −1]. |

9. The method of claim 1 wherein the predetermined table comprises:

| $n_{DMRS}$ | $n_{DMRS}^{(2)}$ | $n_{DMRS}^{OCC}$ |
|---|---|---|
| 000 | 0 | [+1 +1] |
| 001 | 6 | [+1 +1] |
| 010 | 3 | [+1 −1] |
| 011 | 5 | [+1 +1] |
| 100 | 2 | [+1 +1] |
| 101 | 8 | [+1 −1] |
| 110 | 11 | [+1 −1] |
| 111 | 9 | [+1 −1]. |

10. The method of claim 1 wherein the predetermined table comprises:

| $n_{DMRS}$ | $n_{DMRS}^{(2)}$ | $n_{DMRS}^{OCC}$ |
|---|---|---|
| 000 | 1 | [+1 +1] |
| 001 | 7 | [+1 +1] |
| 010 | 4 | [+1 −1] |
| 011 | 5 | [+1 +1] |
| 100 | 2 | [+1 +1] |
| 101 | 8 | [+1 −1] |
| 110 | 11 | [+1 −1] |
| 111 | 10 | [+1 −1]. |

11. The method of claim 1 wherein the predetermined table comprises twelve mapping entries.

12. The method of claim 11 wherein the predetermined table the CS values $n_{DMRS}^{(2)}$ are arranged in two sets.

13. An apparatus for determining cyclic shift (CS) and orthogonal cover code (OCC) values associated with DeModulation Reference Signals (DMRS) for multiple transmission layers in a wireless communication system employing Multiple Input Multiple Output (MIMO) operation, comprising:
a receiver operable to receive a semi-static cyclic shift (CS) value $n_{DMRS}^{(1)}$ and a dynamic CS index value $n_{DMRS}$; and
a controller operable to:
index a predetermined table with $n_{DMRS}$ to obtain a first CS value $n_{DMRS}^{(2)}$ and an orthogonal cover code (OCC) value $n_{DMRS}^{OCC}$ associated with DeModulaton Reference Signals (DMRS) for layer 0;
derive a first CS value associated with DMRS for each other layer by adding a different integer multiple of a predetermined minimum offset to $n_{DMRS}^{(2)}$; and
calculate a second CS value for each layer by adding $n_{DMRS}^{(1)}$ to the first CS value;
wherein within the predetermined table, the CS values $n_{DMRS}^{(2)}$ are arranged in two or more sets of CS values $n_{DMRS}^{(2)}$, the CS values $n_{DMRS}^{(2)}$ within each set being separated by the predetermined minimum offset.

* * * * *